Dec. 19, 1972  L. R. PERSSON  3,706,618
METHOD OF MANUFACTURING A FABRIC-LIKE MATERIAL
Filed Feb. 2, 1968  2 Sheets-Sheet 1

LEIF RAMON PERSSON
INVENTOR.
BY Albert M. Parker
ATTORNEY.

United States Patent Office

3,706,618
Patented Dec. 19, 1972

3,706,618
METHOD OF MANUFACTURING A FABRIC-LIKE MATERIAL
Leif Ramon Persson, Solbacken, Billingsfors, Sweden, assignor to AB Billingsfors-Langed, Billingsfors, Sweden
Filed Feb. 2, 1968, Ser. No. 702,699
Claims priority, application Sweden, Feb. 16, 1967, 2,146/67
Int. Cl. B32b 29/02
U.S. Cl. 156—179                        6 Claims

ABSTRACT OF THE DISCLOSURE

Fabric-like materials are made by impregnating fibrous material, such as a non-woven fabric or tissue paper, with an adhesive plastic elastomer in an aqueous dispersion. The water in the dispersion is removed, and at least one side of the resulting layer is covered with stretchable tissue paper.

---

The object of the present invention is to produce a material which in softness, strength and to the touch resembles a conventionally produced fabric, i.e. a fabric made by spinning and weaving. The material manufactured according to the invention comprises fibrous layers which have been bonded in a special manner so that swelling of the cellulose fibres and their subsequent stiffening during subsequent drying processes is prevented in spite of the fact that resin dispersed in water is used as binding agent.

It is known that several layers of tissue paper can be bonded by means of a net of, for instance, nylon to form a material with greater strength than the individual strength of the tissue paper layers but which in other respects retains the rigidity and feeling of paper. Such material for textile purposes is described in, for instance, the Swedish Pats. Nos. 178,645 and 178,646. It is also known, for instance from the Swedish Pats. Nos. 199,787 and 205,231, to manufacture a fabric-like material from tissue paper impregnated with plastic-sol or organosol. The plastic-sol or organosol is a vinyl resin mixed with a plasticizer in the absence of water. This method provides a very highly viscous plastic mixture. The amount of plastic used when applying such a plastic-sol is larger than the amount of fibre (up to 8 times the quantity of fibre). The material obtains the flexibility and weight of the plastic and at the same time also feels like plastic to the touch and obtains a total thickness and weight which does not make it suitable for use in such articles as sheets and clothes. Despite a pronounced increase in the amount of plastic in such a material tests have shown that the strength of the material is not high enough for the majority of textile purposes, because the plastic binding agent made on the basis of vinyl resin by heat treatment together with its plasticizer has a very poor internal strength. The heat treatment method in the case of such large quantities of plastic results in a low production rate and consequently the cost of producing the material reduces its advantages.

A completely different method must be used than that described in the aforementioned patents if the material is to obtain a greater mechanical strength, contain less plastic and therefore feel less like plastic and more like fabric to the touch, as well as obtain a lower total thickness and weight, making the material more useful, lighter and cooler to wear.

The main object of the present invention is to provide a method of manufacturing a fabric substitute presenting high strength and softness, whereby the above mentioned disadvantages with respect to resembling paper or plastic to the touch are eliminated.

It is known that cellulose paper fibres swell and become hydrated when exposed to water. When subsequently the fibres are dried they become stiff and impart to the material a high rigidity and crispness, causing the material to rustle. This is counteracted by manufacturing paper according to wet methods, by mechanically re-softening the paper by crepeing. When wetted with water the creped so-called tissue paper loses its crimpness and when dried once more it becomes stiff and rustles when touched. Thus, it has not previously been possible to produce combinations between plastic or artificial resin dispersed in water and creped tissue paper without a stiff material resulting.

It is also known that if a fibre material, e.g. creped tissue paper, is impregnated with a large quantity of plastic or artificial resin the plastic or resin will bind together each separate fibre and thus will restrict the relative movement of the individual fibres, which causes the impregnated material to become very stiff.

A further object of the present invention is to circumvent these difficulties encountered when manufacturing fabric substitutes having a high strength.

According to the invention fibre material, for instance non-woven fabric or tissue paper, is impregnated or coated with an adhesive plastic elastomer such as softened rubber latex, polyisobutylene, polyvinyl ester, polyacryl ester or equivalent polymeric derivatives in a water dispersion, in which the water is removed at least partially so that an adhesive layer will be formed which subsequently is covered on one or on both sides by being compressed with stretchable tissue paper, preferably of the creped type, with a crepeing degree of 10–50%, the removal of the water in the adhesive dispersion applied being effected before the step of compressing said tissue paper or the applied fibres, for the purpose of preventing swelling of the cellulose fibres. When working with a plastic dispersion on water-base a very low viscosity is obtained, permitting variation of the quantities of plastic within very wide limits. In dried state the plastic is a greatly softened elastomer having high adhesive qualities. The strongly adhesive fibre layer, in which the fibres simultaneously are combined to a highly permeable and tremendously strong material, is suitably combined in the cold state by applying creped tissue paper to both sides of said layer, by compressing the same in a roll nip.

In this manner the quantities of plastic can be held at 15–20 g./m.$^2$ as opposed to quantities of 80–150 g./m.$^2$ in prior known combinations between plastic and paper for textile purposes. Because of the wide choice of plastic substances on an aqueous dispersion base a plastic dispersion can be selected which at these low quantities in the coating gives a higher degree of strength than the larger quantity of the plastic used in methods prior known. In prior art methods it has been possible to use only one type of plastic (vinyl resin).

Swelling and stiffening of the cellulose is prevented by the adhesive properties of the plastic and the absence of water at the moment when the fibres are combined with the crepe tissue paper. Neither is the degree of crepeing of the paper changed, which is important when considering the retained softness of the paper proper. Further, at the actual moment of combination the adhesive binding layer is so solid that no plastic can penetrate between the separate paper fibres in the tissue paper to thereby restrict the degree of movement between the separate fibres, otherwise resulting in a stiffening of the final combination.

According to a modification of the invention the applied covering tissue paper may be replaced on one or both sides of the adhesive layer by fibres of a cellulosic or of a synthetic character, either blown onto said layer or applied thereto in some other manner and then compressed therewith.

The invention will now be described in detail with reference to examples which, however, do not limit the combination possibilities of the composition or properties of the different layers. The letter designations relate to the enclosed drawing, in which FIGS. 1–3 graphically depict three examples of an arrangement for carrying out the invention.

DETAILED DESCRIPTION OF THE DRAWINGS

The novel fabric-like material of the invention in accordance with the invention will be understood from the following examples, with reference to the accompanying drawings.

EXAMPLE 1 (FIG. 1)

A web of single-layer non-woven fabric $a$ manufactured of rayon, cotton, nylon or some other fibre and having a weight per unit of surface area of 10–40 g./m.$^2$, is impregnated with an adhesive elastomer in the form of an aqueous dispersion in a container $b1$. The elastomer may have the following composition:

Natural rubber latex (60% aqueous dispersion) 20 liters
Petroleum resin (50% aqueous dispersion) 12 liters
Dioctyl phthalate (50% aqueous dispersion) 20 liters Antioxidation agent of the type 2,2'-dihydroxy-3,3'-di($\alpha$-methylcyclo-hexyl) - 5,5' - dimethyl-diphenyl-methane, corresponding to 2% of the quantity of dry natural rubber.

Piccopale A–20 dispersion from Pennsylvania Industrial Chemical Corporation was used in the tests as the petroleum resin.

The non-woven web is impregnated by applying the plastic dispersion thereto by means of roll $b$ and the surplus removed by an air brush (air blade) or by immersing the web into the plastic dispersion and passing the material between a steel roll and a rubber roll $c$ to press out the surplus. The amount of dispersion absorbed should amount to 15–20 g./m.$^2$ for 15 g./m.$^2$ of non-woven web, calculated on the amount of dry adhesive plastic.

The water in the applied dispersion is then evaporated off in a drying cupboard $d$, whereupon the adhesive non-woven web impregnated with plastic elastomer is laminated (sandwiched) between two layers of creped tissue paper, for instance about 10–30 g./m.$^2$ having a crepeing degree of 10–50%. A creped web of tissue paper $e$ and $f$ is applied to either side of the adhesive centre layer. The layers are pressed together in a roll nip, between a steel roll $g$ and a rubber roll $h$. The finished, combined material is rolled up at $i$.

EXAMPLE 2

Figure 1:
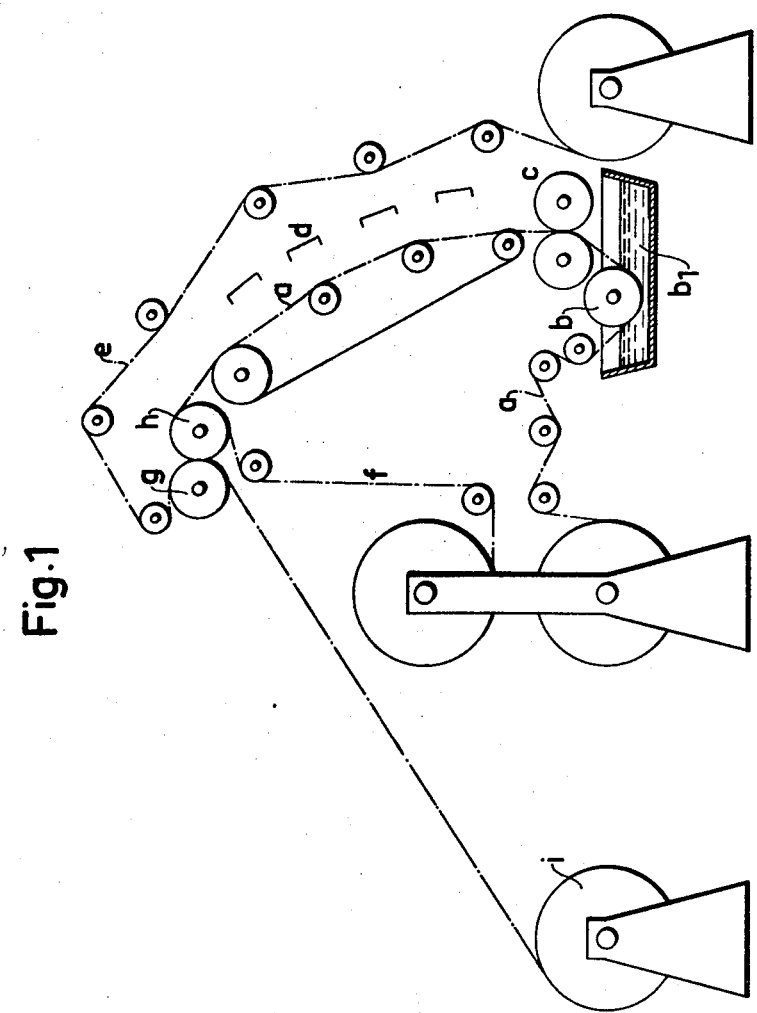
FIG. 1 is a diagrammatic view, with some portions in sections, of apparatus adapted to perform the method of the invention, showing the performance of the method.
Figure 2:
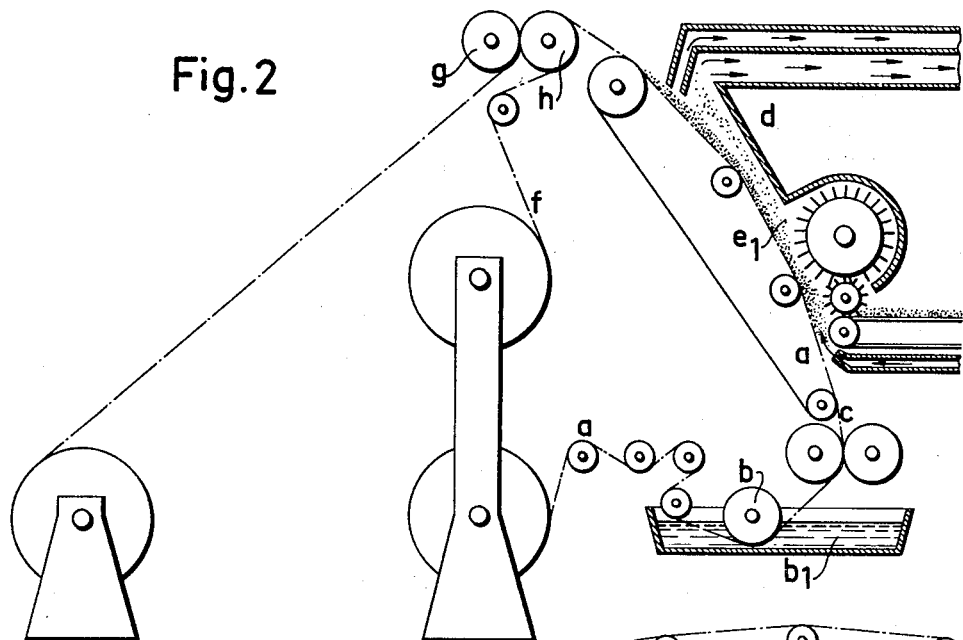
FIG. 2 is a diagrammatic view similar to that of FIG. 1 showing another embodiment of the invention and showing how fibres are applied to one side of an adhesive central layer while the opposite side is covered with a thin paper layer.
Figure 3:
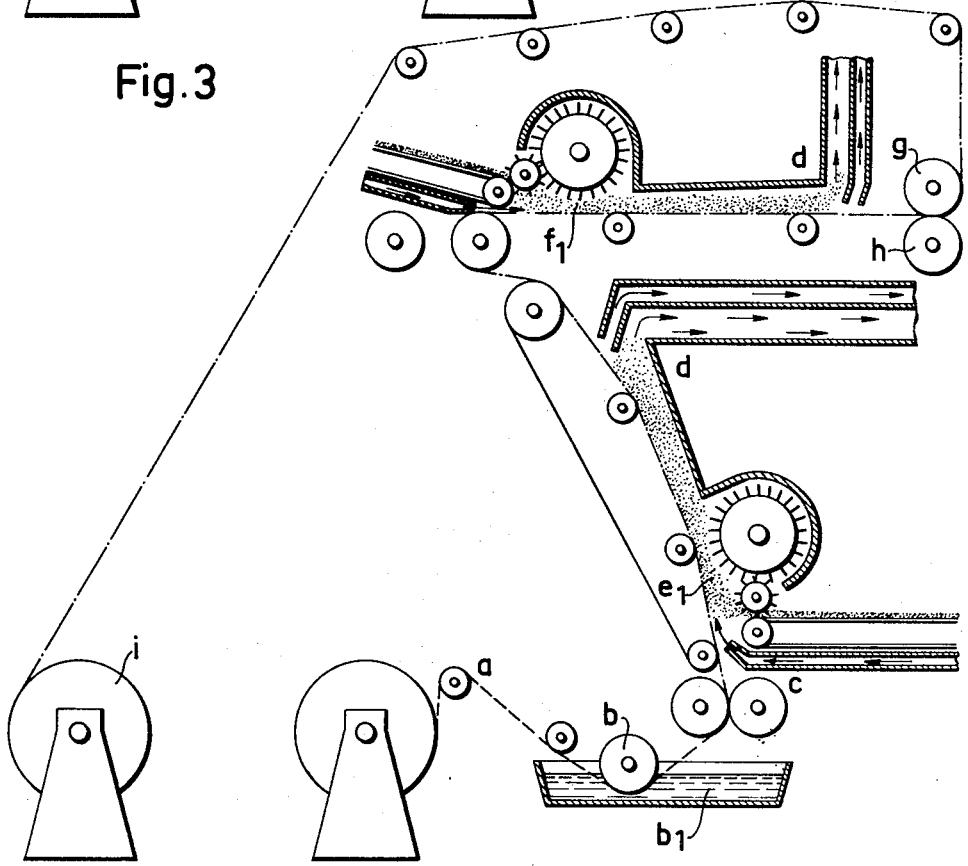
FIG. 3 is a view similar to FIGS. 1 and 2 of another embodiment of the invention wherein fibres are applied to both sides of an adhesive central layer.

In this instance a non-woven web $a$ is impregnated and dried in the same manner as described in Example 1. Paper or textile fibres $e1$ are either blown onto the surface of the adhesive central layer or applied thereto by carding, to a weight per unit of surface area of e.g. 10–15 g./m.$^2$. The fibres can be applied to one side of the adhesive central layer while the other side is covered by a thin layer of crepe tissue paper $f$ (FIG. 2), or to both sides (see $e1$ and $f1$ in FIG. 3) of the adhesive centre layer. The combination is compressed as in Example 1 by passing it through a roll nip, defined by a rubber roll and a steel roll $h$, whereafter the material is rolled up at $i$.

What I claim is:

1. A method of making a material useful as a textile comprising the steps of: impregnating a non-woven fabric manufactured of fibres selected from the group consisting essentially of rayon, cotton and nylon and having a weight per unit surface area of approximately 10–40 g./m.$^2$ with an adhesive plastic elastomer in an aqueous dispersion, said adhesive plastic elastomer being selected from the group consisting essentially of softened latex rubber, polyisobutylene, polyvinyl ester and polyacryl ester removing water from said dispersion to form an adhesive layer with no excess water which would cause swelling of cellulose fibres; and subsequently covering said adhesive layer by pressing said layer together with stretchable tissue paper without wetting said tissue paper, whereby no swelling occurs in the fibres of said tissue paper, to form a soft, textile-like surface.

2. The method of claim 1 including covering two opposite sides of said adhesive layer in the step of pressing the layer together with said stretchable tissue paper.

3. The method of claim 1 wherein said tissue paper is crepe paper having a crepeing degree of from 10–50%, said crepeing degree remaining substantially unchanged in the product material.

4. A method of manufacturing a material useful as a textile material comprising the steps of: impregnating a non-woven fabric manufactured of fibres selected from the group consisting essentially of rayon, cotton and nylon and having a weight per unit area of approximately 10–40 g./m.$^2$ with an adhesive plastic elastomer in an aqueous dispersion, said adhesive elastomer being selected from the group consisting essentially of softened latex rubber, polyisobutylene, polyvinyl ester and polyacryl ester; removing water from said dispersion to form an adhesive layer with no excess water which would cause swelling of cellulose fibers; and subsequently covering said adhesive layer by applying cellulose fibres to said adhesive layer without wetting said fibres and compressing said cellulose fibres with said adhesive layer.

5. The method of claim 4 wherein said cellulose fibres are applied to both sides of said adhesive layer.

6. The method of claim 4 wherein said fibres are blown on to the surface of said adhesive layer.

References Cited

UNITED STATES PATENTS

| | | | |
|---|---|---|---|
| 2,089,034 | 8/1937 | Nevin | 156—313 |
| 2,219,447 | 11/1940 | Groff | 156—313 |
| 2,304,263 | 12/1942 | Lüty | 156—313 |

(Other references on following page)

UNITED STATES PATENTS

| | | | |
|---|---|---|---|
| 2,434,795 | 1/1948 | Glasing et al. | 156—313 |
| 2,483,330 | 9/1949 | Bartlett et al. | 156—313 |
| 2,824,035 | 2/1958 | Finlayson et al. | 156—313 |
| 2,831,794 | 4/1958 | Elmendorf | 156—276 |
| 3,068,130 | 12/1962 | Gaquin et al. | 165—313 |
| 3,244,572 | 4/1966 | Nicol | 156—276 |
| 3,275,491 | 9/1966 | Redfern | 156—313 |
| 2,020,928 | 11/1935 | Asnes | 156—183 |
| 2,094,613 | 10/1937 | McBarney et al. | 161—128 |
| 2,349,236 | 5/1944 | Bodle | 156—302 |
| 2,736,679 | 2/1956 | Nickerson | 156—338 |
| 3,026,199 | 3/1962 | Harwood | 161—129 |
| 3,424,643 | 1/1969 | Lewis et al. | 161—129 |

CARL D. QUARFORTH, Primary Examiner

F. M. GITTES, Assistant Examiner

U.S. Cl. X.R.

156— 178, 183, 279, 290, 297, 313, 324